United States Patent [19]

Job et al.

[11] Patent Number: 5,034,361
[45] Date of Patent: Jul. 23, 1991

[54] CATALYST PRECURSOR PRODUCTION

[75] Inventors: Robert C. Job, Houston, Tex.; Daniel P. Zilker, Jr., Flemington, N.J.; John C. Chadwick, Am Amsterdam, Netherlands

[73] Assignees: Shell Oil Company, Houston, Tex.; Union Carbide Chemicals and Plastics Company, Inc., Danbury, Conn.

[21] Appl. No.: 527,804

[22] Filed: May 24, 1990

[51] Int. Cl.$^5$ ................................................ C08F 4/50
[52] U.S. Cl. ........................................ 502/9; 502/120; 502/125; 502/132; 502/133; 502/171
[58] Field of Search ............... 502/9, 120, 125, 132, 502/133, 171

[56] References Cited

U.S. PATENT DOCUMENTS

| | | | |
|---|---|---|---|
| 4,329,253 | 5/1982 | Goodall et al. | 252/429 B |
| 4,375,564 | 3/1983 | Edwards | 502/170 |
| 4,393,182 | 7/1983 | Goodall et al. | 526/125 |
| 4,400,302 | 8/1983 | Goodall et al. | 252/429 B |
| 4,414,132 | 11/1983 | Goodall et al. | 502/169 |
| 4,540,679 | 9/1985 | Arzoumanidis et al. | 502/111 |
| 4,663,299 | 5/1987 | Chadwick et al. | 502/171 |
| 4,771,024 | 9/1988 | Nestlerode et al. | 502/127 |

FOREIGN PATENT DOCUMENTS 2101610A 1/1983 United Kingdom .

*Primary Examiner*—Patrick P. Garvin
*Assistant Examiner*—Brent M. Peebles
*Attorney, Agent, or Firm*—Peter A. Bielinski

[57] ABSTRACT

Normally sparingly soluble magnesium alkoxide is solubilized in alkanol by the additional presence of certain acidic materials. The resulting solution is used to produce a mixture of substantially spherical particles, substantially free of fines, containing an adduct magnesium alkoxide. The particles are converted by conventional methods to a procatalyst precursor of an olefin polymerization catalyst of good activity and good selectivity to stereoregular polymer whenever appropriate, which catalyst produces polymer product of good morphology.

31 Claims, No Drawings

CATALYST PRECURSOR PRODUCTION

FIELD OF THE INVENTION

This invention relates to the production of a precursor of an olefin polymerization catalyst. More particularly, the invention relates to the production of a magnesium alkoxide compound. The magnesium alkoxide compound is a useful precursor of a procatalyst of an olefin polymerization catalyst employed in the production of polyolefin product having good morphology.

BACKGROUND OF THE INVENTION

Numerous examples are available in the art for the production of an olefin polymerization catalyst by combining a solid component containing at least magnesium, titanium and chlorine with an activating organoaluminum compound. These catalysts are conventionally referred to as supported coordination catalysts or catalyst systems. The activity and stereo-specific selectively of such catalysts is generally improved by incorporating an electron donor, i.e., a Lewis base, in the solid component and by employing as a third catalyst component an electron donor which is complexed in whole or in part with the activating organoaluminum compound. Employing terminology which is conventional in the art of polymerization catalysts, the solid titanium-containing compound is referred to as a "procatalyst," the organoaluminum compound, whether complexed or not, is referred to as the "co-catalyst" and the third component electron donor, whether used separately or partially or totally complexed with the organoaluminum compound is referred to as a "selectivity control agent" (SCA).

Supported coordination catalysts of this type are broadly and generally known to produce olefin polymers in high yield and, in the case of polymers of propylene or higher α-olefins, to produce polymers with a high selectivity to stereoregular polymers. The activity of the coordination catalyst is of particular importance because of the desirability of avoiding the necessity to extract catalyst residues from the polymer in a deashing step. The selectivity to stereoregular polymer is of importance because of the desirability of avoiding a process step to extract atactic polymer when α-olefins of three or more carbon atoms are polymerized.

Many chemical combinations of procatalysts, co-catalysts and selectivity control agents are known in the art to produce active catalysts. However, considerable experience has resulted in certain materials being of greater interest. The procatalyst is typically some chemical combination of magnesium chloride and titanium tetrachloride and the electron donor is frequently an aromatic ester such as ethyl benzoate or ethyl p-toluate. The co-catalyst is frequently an aluminum trialkyl such as triethylaluminum or triisobutylaluminum which is often complexed with a portion of the selectivity control agent which is also, typically, an aromatic ester. While variations in any of these catalyst components will influence the performance of the catalyst which results, the component which seems to offer the greatest opportunity for modification to produce greater catalyst activity is the procatalyst.

Preferred methods of producing procatalysts are the subject of a number of U.S. patents including U.S. Pat. Nos. 4,329,253, 4,393,182, 4,400,302 and 4,414,132. These procatalysts, useful in the production of olefin polymerization catalysts of high activity and stereoregular selectivity, are generally prepared by contacting a magnesium compound, titanium tetrachloride and the electron donor in the presence of a halohydrocarbon. The resulting particles are then contacted with additional titanium tetrachloride before washing off the excess titanium tetrachloride with a light hydrocarbon solvent, e.g., isooctane, and drying the procatalyst.

Even in instances where an olefin polymerization catalyst composition of acceptable catalytic activity and stereospecific selectivity is obtained, other considerations are important. It is highly desirable to produce polyolefin polymer having a specific morphology, e.g., polymer product in the physical form of spheroidal particles of uniform size and without the presence of any substantial quantity of small, irregular polymer particles such as fines. It is known that in olefin polymerizations the morphology of the polymer product is a replica of the morphology of the catalyst employed in its production. It is also known that the morphology of the catalyst is dictated to a considerable extent by the morphology of the procatalyst and particularly by the morphology of the magnesium compound used as the support. Thus, production and use of a magnesium compound of desirable morphology will generally result in the ultimate production of polyolefin polymer of desirable morphology.

A variety of procedures are available which are designed to produce a magnesium compound support, or the transition metal catalyst produced therefrom, of improved morphology. GB No. 2,101,610 reacts a solid particulate material with an organic magnesium compound, treats the resulting magnesium compound with oxygen, carbon dioxide or a hydroxyl compound and reacts the treated product, simultaneously or in sequence, with a carbonyl compound and a transition metal compound. In another process a dispersion of solid magnesium alkoxide particles in a suitable liquid medium are employed as the feed for a spray drying process, but the solid particles are a disadvantage because of the tendency of the particles to clog the fine orifices of the spray drying equipment. In U.S. Pat. No. 4,540,679 a magnesium compound, i.e., a magnesium hydrocarbyl carbonate, is used as the support which is produced by reacting a suspension of magnesium alkoxide and carbon dioxide. In U.S. Pat. No. 4,771,024 a solution of a carbonated magnesium alkoxide is produced by bubbling carbon dioxide through a suspension of magnesium ethoxide in a diluent such as an alkanol. The resulting solution is used to impregnate a solid inorganic support or to produce particulate magnesium ethoxide by spray drying. The support particles thereby obtained are of desirable morphology and are useful precursors of olefin polymerization procatalysts. However, some degree of care must be taken during the reaction of the magnesium alkoxide and the carbon dioxide because of the exothermic nature of the reaction and the viscous nature of the solution which results.

SUMMARY OF THE INVENTION

The present invention provides an improved process for the production of a magnesium alkoxide compound precursor of an olefin polymerization catalyst. More particularly, the invention provides a process of solubilizing a magnesium alkoxide in an alkanol solvent by interaction of the magnesium alkoxide compound and certain acidic materials. The solution thereby produced is used to produce, by conventional methods, a solid magnesium alkoxide compound composition of desired morphology. Use of this composition as a precursor of transition metal olefin polymerization catalysts, particularly for the polymerization of olefins of three or more carbon atoms, results in a polyolefin polymer product which also exhibits desirable morphology. The invention also relates to the solubilized magnesium alkoxide composition and to the solid products derived therefrom.

DESCRIPTION OF THE INVENTION

The process of the invention comprises the solubilization of a magnesium alkoxide, particularly magnesium ethoxide, in an alkanol, particularly ethanol, by interaction of the magnesium alkoxide with certain acidic materials. The magnesium alkoxide solution is then converted to a solid product useful as a precursor of olefin polymerization catalysts by a number of procedures. Magnesium alkoxide and particularly magnesium ethoxide is known to be a useful precursor of olefin polymerization procatalysts. Solid magnesium alkoxide products are produced from solutions of magnesium alkoxide by broadly known procedures such as spray drying, freeze drying and impregnation of silica-containing particulates. These solid products are of a desirable morphology and are utilized to produce olefin polymerization procatalysts and ultimately olefin polymers which also exhibit desirable morphology. However, the solubility of magnesium ethoxide in ethanol, for example, is known to be on the order of about 0.1% by weight magnesium and such a solution is too dilute to be efficiently used in the production of magnesium alkoxide solids for olefin polymerization procatalysts. This low solubility of magnesium alkoxides in alkanol is thought to be due to the polymeric nature of a magnesium alkoxide. Without wishing to be bound by any particular theory, it appears likely that the acidic materials react with the polymeric magnesium alkoxide to form an adduct and the resulting species has a higher solubility in alkanol.

The magnesium alkoxides of the present invention are magnesium alkoxides wherein each alkoxide has up to 4 carbon atoms. The alkyl moiety of the alkoxide is straight-chain or branched and illustrative alkoxide groups are methoxide, ethoxide, 1-propoxide, sec-butoxide and n-butoxide. The magnesium alkoxide compounds magnesium methoxide and magnesium ethoxide comprise a preferred class of magnesium alkoxides and particularly preferred is magnesium ethoxide. Other examples of magnesium alkoxides are the crystalline $Mg_4(OCH_3)_6(CH_3OH)_{10}X_2$, where X is a counter ion or ions with a total charge of minus two; for example, X can be Cl, Br, methacrylate, butyrate, acrylate, acetate, resorcinolate, 2,4-pentanedionate, propionate, benzoate or chloroacetate.

The alkanol in which the magnesium alkoxide is solubilized is a lower alkanol of up to 4 carbon atoms as illustrated by methanol, ethanol, isopropanol and sec-butanol. Methanol and ethanol are preferred and particularly preferred is ethanol. Although it is not necessary that the alkyl moiety of the alkanol correspond to the alkyl moieties of the magnesium alkoxide, it is generally preferred to use magnesium alkoxides and alkanols of corresponding alkyl moieties. Thus, in a particularly preferred embodiment of the invention, the magnesium alkoxide is magnesium ethoxide and the alkanol of its solubilization is ethanol.

The acidic material used to solubilize the magnesium alkoxide is one of certain acidic materials. The solubilizing material is acidic in the sense of a Lewis acid, that is, a compound capable of accepting a pair of electrons to form a coordinate covalent bond. Not all Lewis acids, however, are effective in ultimately producing olefin polymerization procatalysts. Some Lewis acids are not sufficiently active in solubilizing the magnesium alkoxide. Other Lewis acids which are effective in solubilizing the magnesium alkoxide are also poisons for the olefin polymerization catalyst produced from the magnesium alkoxide and the trace quantities of Lewis acid present in the magnesium-containing precursors of the catalyst preclude effective olefin polymerization. The acidic materials that are useful solubilizing agents without precluding the eventual olefin polymerization are sulfur dioxide, formaldehyde, aluminum alkoxide and trialkyl borates.

The sulfur dioxide is employed as the gas and typically a magnesium alkoxide and an alkanol are mixed and sulfur dioxide is bubbled through the resulting mixture to effect solubilization. When the acidic solubilizing agent to be used is formaldehyde, it is preferred to use an anhydrous form of formaldehyde, i.e., paraformaldehyde. The aluminum alkoxides which are useful acidic materials in the process of the invention are of the formula $$Al(OR)_3 \qquad (I)$$

wherein R independently is alkyl of up to 10 carbon atoms inclusive, e.g., methyl, ethyl, i-butyl, sec-amyl, hexyl or decyl. However, better results are obtained when each R is lower alkyl of up to 4 carbon atoms and particularly preferred as the R group are methyl and ethyl. It is preferred, although not required, that when aluminum alkoxide is used to solubilize magnesium alkoxide in alkanol, the alkyl moiety of the aluminum alkoxide correspond to the alkyl moiety of the magnesium alkoxide and the alkanol. Such correspondence serves to minimize the possibility of ester exchange during the solubilization process.

The preferred acidic solubilizing agent is a trialkyl borate ester of the formula $$B(OR)_3 \qquad (II)$$

wherein R has the previously stated meaning. Trimethylborate and triethylborate are the preferred members of this class, particularly triethylborate, and for the reasons stated above it is preferred that the alkyl moieties of the borate ester correspond to the alkyl moiety of the magnesium alkoxide and the alkanol.

The quantity of acidic material to be employed is sufficient to provide from about 0.4 mole to about 2 moles of the acidic material per mole of magnesium (as the alkoxide) to be solubilized. Preferably, sufficient acidic material is employed to provide from about 0.8 mole to about 2.0 moles of acidic compound per mole of magnesium.

The magnesium alkoxide and the acidic material are contacted in sufficient alkanol to permit complete dissolution of the magnesium alkoxide in the alkanol. Sufficient alkanol is provided to yield a solution of from about 1% by weight to about 6% by weight of magnesium (as the complex alkoxide) in alkanol, based on total solution. Preferred alkanol solutions are those containing from about 2% by weight to about 5% by weight of magnesium on the same basis. From a processing consideration the production of reasonably concentrated solutions of the magnesium alkoxide compound are preferred and the solutions are subsequently diluted with additional alkanol if more dilute solutions are preferred, for example, as for the spray drying process.

The dissolution of the magnesium alkoxide compound in alkanol is conducted by contacting magnesium alkoxide, the acidic material and alkanol at a moderate temperature. Substantial dissolution of the magnesium alkoxide, and often complete dissolution of the magnesium alkoxide if dilute solutions are to be formed, takes place at or about ambient temperature. Dissolution is more rapid if some form of agitation, e.g., shaking or stirring, is provided. It may be necessary in order to obtain complete dissolution at an acceptable rate to warm the mixture to a somewhat elevated temperature, for example, up to about 80° C., more often up to about 60° C. However, a solution resulting from such warming will remain clear upon returning to ambient temperature.

In one embodiment of the process of the invention the magnesium alkoxide is provided as a preformed material. Several magnesium alkoxides of reasonable purity are available commercially and are used without any special purification or drying. The magnesium alkoxide, acidic material and alkanol are mixed and maintained at a suitable temperature until dissolution is complete. In an alternate embodiment of the invention, the magnesium alkoxide is formed in situ by the addition of elemental magnesium to the alkanol and acidic material. The metallic magnesium is provided as chunks, turnings or in a finely divided form, e.g., 50 mesh or smaller, and the reaction of the metal with a portion of the alkanol is catalyzed by the presence of a material such as ferric chloride. In this embodiment it is typically desirable to employ a filtration step to remove insolubles introduced with the magnesium. In the embodiment where an aluminum alkoxide is employed as the acidic material, the aluminum alkoxide is suitably also produced in situ by this method upon addition of elemental aluminum.

By whichever embodiment is utilized, the resulting material is a solution of the magnesium alkoxide compound, likely present in a complex with the acidic material, in alkanol. The concentration of the magnesium species is from about 1% by weight magnesium to about 8% by weight magnesium, preferably from about 2% by weight magnesium to about 6% by weight magnesium, based on total solution. The solution has a molar acidic material:magnesium ratio of from about 0.4 to about 2, preferably from about 0.6 to about 2.0.

The solution of magnesium alkoxide-acidic material in alkanol is then used to produce a magnesium alkoxide-containing solid to be utilized in the production of the olefin polymerization procatalyst by conventional methods such as impregnation, spray drying or spray cooling.

The spray drying process is conducted by procedures such as that described by Nestlerode et al, U.S. Pat. No. 4,771,024. The magnesium-containing solution to be spray dried is passed through a suitable atomizer to produce a spray or dispersion of droplets of the liquid mixture, a stream of hot gas such as nitrogen is arranged to contact the droplets to evaporate the solvent and the resulting solid product is collected. The atomization of the solution customarily takes place in the absence of water or oxygen and nozzle atomizers or spinning disk atomizers are usefully employed.

The temperature at which the spray drying takes place is controlled largely by the temperature of the gas employed to impact the droplets and will be of some importance in determining the physical nature of the spray dried product. For an ethanol solution of given solute content, for example, too high a spray drying temperature results in hollow, splintered particles. Too low a drying temperature will result in incomplete removal of solvent and particle agglomeration. Spray drying temperatures from about 40° C. to about 120° C. are satisfactory for the solutions produced according to the invention although temperatures from about 50° C. to about 90° C. are preferred.

The mechanical arrangement of the spray drying process is not critical. The hot gas may contact the droplets in a countercurrent manner although a co-current flow of the hot gas and the solution to be dried is usually preferred. In such an arrangement the atomizer is typically located near the top of a spray dryer and the hot gas is introduced at the top of the apparatus and is removed near the bottom. A major portion of the spray dried product is removed from the bottom of the apparatus by conventional procedures as by the use of a feeder valve or a conveyor. A lesser portion of the product is entrained in the hot gas and is recovered by passage of the gas through a cyclone separator. The alkanol is often condensed and recycled and the circulating gas is suitably reheated and returned to the top of the apparatus for reuse. A description of a conventional spray drying apparatus and conditions for its use is found in U.S. Pat. No. 4,465,783.

The resulting spray dried product is predominantly magnesium alkoxide with up to a lesser amount of the acidic compound. The physical form of the product will be substantially uniform particles having the general shape and appearance of a dried pea and a particle size of from about 8 microns to about 100 microns. It is characteristic of the magnesium alkoxide materials of one embodiment of the invention that the spray dried product will be uniform in size with no more than about 1% of the particles being outside the 8 to 100 micron range and the product will be substantially free of fines.

The spray dried product is likely an adduct of magnesium alkoxide with up to a reduced proportion of acidic compound as some or all of the acidic compound is lost during the spray drying process. The spray dried product has a molar acidic compound:magnesium ratio of up to about 1.7, preferably from about 0.3 to about 0.8. Any remaining presence of acidic compound is not detrimental when the magnesium alkoxide compound particles are employed in the production of a procatalyst to be used in olefin polymerization.

Although spray drying constitutes a preferred method of producing the magnesium alkoxide-containing solid precursor of the olefin polymerization procatalyst, other methods are also useful. A second method of producing magnesium alkoxide containing particles of the desired morphology is by impregnating an inert particulate support having the desired morphology with the alkanolic solution containing the magnesium alkoxide. Such inert particulate materials include inorganic materials such as oxides of silicon or aluminum and molecular sieves, as well as organic materials such as polyesters. The use of inorganic supports such as inorganic oxides is preferred, which supports are typically used in the form of a dry powder having a particle size of from about 10 microns to about 250 microns and preferably from about 50 microns to about 150 microns.

The inorganic supports are preferably porous and have a surface area of at least about 3 sq. meters per gram and preferably at least about 50 sq. meters per gram. The inorganic supports are preferably free from adsorbed water and if necessary are dried as by heating to an elevated temperature, e.g., above 200° C.

The inorganic support is added to the alkanol solution containing magnesium alkoxide and, after mixing, the alkanol solvent is evaporated. The alkanol is evaporated at or about the normal boiling point of the alkanol at ambient pressure or at a lower temperature at reduced pressure until the resulting powder appears to be dry. If necessary, the powder may be washed with a hydrocarbon solvent, e.g., isooctane, to insure that the alkanol has been removed. This method of providing procatalyst precursor is described in more detail in Nestlerode et al, U.S. Pat. No. 4,771,024.

Yet another method by which the alkanol solution is employed to produce a magnesium alkoxide solid is the process termed spray cooling. In this procedure, also conventional, a hot, concentrated solution of the magnesium alkoxide-acidic compound adduct in alkanol is passed rapidly into a chilled liquid with which the alkanol is largely immiscible. Hydrocarbon fractions such as kerosene are often used for this purpose. The rapid cooling and supersaturation of the alkanol solution results in the production of solid, spheroidal particles containing magnesium alkoxide, which particles are of substantially uniform size and are substantially free from fines.

By whatever method the magnesium alkoxide-containing particles are produced, the olefin polymerization procatalyst is produced therefrom by conventional procedures such as by treatment of particles with titanium tetrachloride in solution in a halohydrocarbon solvent such as chlorobenzene and an electron donor such as a phthalate ester. In turn, the procatalyst thereby produced is contacted with a triethylaluminum cocatalyst and a conventional selectivity control agent and the resulting catalyst is employed in the polymerization of olefins such as ethylene or propylene.

The catalysts produced from the magnesium alkoxide compound particles of the invention provide high catalytic activity and in the case of propylene or higher $\alpha$-olefins provide an acceptable selectivity to stereoregular product. The advantages of employing the magnesium containing procatalyst precursors of the invention are most apparent, however, in the morphology of the polymer product. In the case of the polymerization of propylene, for example, the polypropylene product is obtained as substantially uniform spherical particles with the substantial absence of fines or other materials of undesirably small particle size.

The invention is further illustrated by the following Illustrative Embodiments which should not be regarded as limiting the invention.

ILLUSTRATIVE EMBODIMENT I

A 10.0 g (87 mmol) quantity of magnesium ethoxide, 25.5 g (175 mmol) of triethylborate and 110 ml of ethanol were mixed at room temperature (27° C.). After 10 minutes the temperature had risen to 34° C. and after 1 hour without heating a cloudy solution was obtained in which the molar ratio of boron:magnesium was approximately 2.0. A further 14 g (122 mmol) of magnesium ethoxide was added and the resulting mixture was heated in an oil bath maintained at 57° C. while being stirred. The resulting solution was clear and no precipitate formed while the solution stood overnight at room temperature. Analysis of this solution indicated a magnesium content of 2.6% by weight based on total solution and a boron content of 1.04% by weight on the same basis. The final calculated molar boron:magnesium ratio was 0.9.

The triethylborate used in this and other Embodiments was produced by the novel process of slurrying 507 g (7.28 mole) of boric oxide in tetraethylorthosilicate (2941 g, 14.1 mole). The mixture was heated, while being stirred, until distillation began. After a small amount of an ethanol azeotrope and some unidentified material collected at 75° C. to 90° C., about 2 liters of triethylborate was collected at 105° C. to 125° C. The product was analyzed and found to contain 6.0% boron, thereby indicating that the product was 81% triethylborate. (The 19% ethanol is a consequence of moisture from the extremely hygroscopic $B_2O_3$.)

ILLUSTRATIVE EMBODIMENT II

A mixture of 10.8 g (94 mmol) of magnesium ethoxide, 10.8 g (74 mmol) of triethylborate and 10.9 g of ethanol was held overnight in an oil bath maintained at 80° C. The magnesium content of the resulting clear solution was 7.1% by weight and the molar boron:magnesium ratio was 0.8. Upon cooling to room temperature the mixture became viscous but was still pourable. Upon standing for 1 week at room temperature some crystals had formed but no precipitate was present when the solution was diluted with ethanol to 6% by weight magnesium.

ILLUSTRATIVE EMBODIMENT III

A 21.2 g (185 mmol) quantity of magnesium ethoxide was slurried in 104 g of ethanol and 19.3 g (185 mmol) of trimethylborate containing some methanol was added. The resulting reaction was noticeably exothermic as about 90% of the magnesium ethoxide went into solution without heating. The mixture was then warmed to about 70° C. to yield a cloudy solution. Upon standing overnight at room temperature, no precipitation occurred. The magnesium content of the solution was 3% by weight and the molar boron:magnesium ratio was 1.0.

When this experiment was repeated with a 10% additional quantity of methyl borate being present, the amount of solid remaining undissolved without heating was again about 10%.

Trimethylborate was produced by the general procedure described above for triethylborate except that tetramethylorthosilicate was used instead of the corresponding ethyl material. The trimethylborate produced analyzed 9.6% boron, thus indicating a product containing 92% trimethylborate.

ILLUSTRATIVE EMBODIMENT IV

A 5.55 g (0.23 mole) quantity of 50 mesh magnesium metal and 25 g (0.17 mole) of triethylborate were slurried in 50 g of ethanol. About 0.5 g of 10% ferric chloride in ethanol and 0.12 g of bromine were added and the slurry was allowed to stand until effervescence became vigorous (about 10 minutes). Over the next 20 minutes another 50 g of ethanol were added. The reaction was allowed to continue overnight without heating but with stirring. After adding additional ethanol to replace that which had been lost during the vigorous ebulliation, the mixture was heated for about one hour to dissolve the last few magnesium granules and the cloudy solution was filtered through a medium porosity fritted glass disk to remove 0.2 g of a grey solid. A moderately viscous, clear solution was obtained with a magnesium content of about 4.1% and a molar boron:-magnesium ratio of about 0.8.

ILLUSTRATIVE EMBODIMENT V

Magnesium ethoxide (40 g, 0.35 mole) was slurried in 300 g of ethanol and sulfur dioxide was bubbled through the slurry. After four minutes, 21.5 g (0.34 mole) of sulfur dioxide had been added to the ethanol mixture. The hot mixture was allowed to cool and it was observed that substantially all of the magnesium ethoxide had dissolved. The bubbling of sulfur dioxide was resumed and 30.9 g (0.27 mole) of additional magnesium ethoxide was added. After a total of 80.3 g (1.2 mole) of sulfur dioxide has been added to the ethanol mixture a clear solution was obtained. The magnesium content of the solution was 3.52% and the sulfur dioxide:magnesium ratio was 2.0.

ILLUSTRATIVE EMBODIMENT VI

Magnesium ethoxide (10 g, 87 mmol) and aluminum ethoxide (28.6 g, 176 mmol) were slurried in 230 g of ethanol. No reaction was observed at room temperature but as the temperature of the mixture was raised to 63° C. an opalescent solution was obtained. An additional 10 g (87 mmol) of magnesium ethoxide was added and dissolved after stirring at 63° C. for over 1 hour. The magnesium content of the solution was 1.5% and the molar aluminum/magnesium ratio was 1.0.

ILLUSTRATIVE EMBODIMENT VII

Magnesium metal (50 mesh, 9.65 g, 0.4 mole) and aluminum metal (20 micron powder, 10.75 g, 0.4 mole) were slurried in 55 g of ethanol. About 1 ml of 10% ferric chloride in ethanol and 2 drops of bromine were added and the slurry was allowed to stand until the effervescence became vigorous in about 10 minutes. Over the next 10 minutes 240 g of additional ethanol were added. The reaction was allowed to proceed while being stirred but not heated until no further hydrogen evolution was observed in about 3 hours. Additional ethanol was added to replace that lost during the reaction and the resulting cloudy solution was filtered through a medium fritted disk. A moderately viscous, clear solution was obtained with a magnesium content of about 3% and a molar magnesium/aluminum ratio of about 1.0.

ILLUSTRATIVE EMBODIMENT VIII

Magnesium ethoxide (66.3 g, 0.58 mole) and paraformaldehyde (30 g, 1.0 mole) was slurried in 303 g of ethanol at room temperature to produce a solution containing 3.5% magnesium with a molar formaldehyde/magnesium ratio of 1.7. When this experiment was repeated using a molar formaldehyde/magnesium ratio of 2, a thick slush was obtained after overnight standing.

ILLUSTRATIVE EMBODIMENT IX

Porous silica spheres obtained from the PQ Corporation (30 micron particle size, pore volume of 2.7 cc/g) were dried in vacuo for 2 days at 300° C. A quantity of 29.3 g of the magnesium solution of Illustrative Embodiment II was stirred slowly into 10.0 g of the dried silica to produce a material of the consistency of sawdust. The material became a free flowing powder as 1.0 g of ethanol evaporated at ambient temperature. After drying in a stream of nitrogen for 1 hour at ambient temperature the total weight had decreased to 25 g indicating complete loss of ethanol. After standing overnight in a crystallizing dish on a hotplate at about 90° C., the weight decreased to 18.5 g indicating loss of the triethylborate.

A polymerization catalyst was produced from this magnesium ethoxide impregnated silica. The impregnated silica (7.8 g) was stirred with 2.5 ml of diisobutylphthalate in 200 ml of 50/50 by volume titanium tetrachloride/chlorobenzene for 1 hour at 115° C. and then filtered while hot. The solids were washed twice with fresh 200 ml portions of the titanium tetrachloride/chlorobenzene mixture and then rinsed once with 150 ml of isooctane at 90° C. and then once with isooctane at room temperature. The resulting solid was then dried under flowing nitrogen at room temperature for 100 minutes. The resulting dried solid analyzed as follows: 3.81% Ti, 9.14% Mg, 35.2% Cl and 0.57% B. A polymerization was conducted using this procatalyst and a triethylaluminum cocatalyst in liquid propylene with diisobutyldimethoxysilane as a selectivity control agent. The process produced 13.9 kg of polypropylene/g of catalyst in 1 hour at 67° C. with xylene solubles of 2.4%.

ILLUSTRATIVE EMBODIMENT X

By the procedure of Illustrative Embodiment IV a series of three solutions was produced wherein each contained 0.8 equivalent of triethylborate per equivalent of magnesium ethoxide. To each of two of the solutions was added a small amount of AEROSIL ®, a commercially available fumed silica which served to provide better surface properties to the solids obtained upon spray drying of the solutions. Each solution was diluted to about 2% by weight of magnesium and spray dried at 100° C. using conventional spray drying equipment. The composition of the spray dried products is shown in Table I.

TABLE I

| Sample | % AEROSIL ® | Solids Composition % Mg | % B | Solids Description |
|---|---|---|---|---|
| A | 0 | 14.1 | 2.0 | Spherical to Shrunken Pea |
| B | 3.5 | 11.9 | 1.9 | Spherical to Shrunken Pea |
| C | 1.75 | 13.2 | 1.6 | Spherical to Shrunken Pea |

Polymerization procatalysts were prepared from the spray dried solids. An amount of each solid containing 50 mmol of magnesium was stirred with 1.9 ml of diisobutylphthalate in 150 ml of 50—50 (by volume) titanium tetrachloride-chlorobenzene for 1 hour at 115° C. and then filtered while hot. The solids were washed twice with fresh 150 ml portions of the TiCl₄-chlorobenzene mixture, rinsed once with 15 ml of isooctane at 90° C., twice with isooctane at room temperature and then dried under a nitrogen stream for 100 minutes. The composition of the solids is shown in Table II. Each of the procatalysts had the general appearance of a shrunken pea.

TABLE II

| Procatalyst Sample | Solids Composition % Ti | % Mg | % Cl | % B |
|---|---|---|---|---|
| A | 2.8 | 16.1 | 54.4 | 1.9 |
| B | 1.7 | 12.7 | 41.3 | 1.5 |

TABLE II-continued

| Procatalyst Sample | Solids Composition | | | |
|---|---|---|---|---|
| | % Ti | % Mg | % Cl | % B |
| C | 1.6 | 14.4 | 47.4 | 1.6 |

The analysis of chlorine content as a function of the titanium and magnesium content indicates that essentially all of the chlorine is likely associated with titanium and magnesium and the boron is present as a borate ester and not as a boron chloride species.

Employing each of the above procatalysts, polymerization of propylene was conducted in liquid propylene using triethylaluminum as co-catalyst and diisobutyl-dimethoxysilane as the selectivity control agent. The catalyst activity in each case was comparable to a conventional olefin polymerization catalyst and the polypropylene product comprised substantially uniform spherical particles with few, if any, fines.

ILLUSTRATIVE EMBODIMENT XI

Polymeric magnesium methoxide ($[Mg(OMe)_2]_n$) was prepared by evaporation of methanol from commercial 8% $Mg(OMe)_2$ under moving nitrogen then heating the solid at 170° for 2 days. The solids were washed twice with warm methanol to remove any soluble, non-polymerized material then washed with isooctane then dried under moving nitrogen.

To 6.0 g of the insoluble $[Mg(OMe)_2]_n$ (69.5 mmol) slurried in 35 g of methanol was added 7.2 g of trimethylborate (69.5 mmol). The mixture was warmed to about 60° to obtain a thick slush. Addition of another 3.7 g of trimethylborate (36 mmol) to the warm mixture produced a cloudy solution with some solids present. After a total of 14.4 g of trimethylborate (139 mmol) had been added a slightly cloudy solution (with about 0.2 g of solids present) was obtained. Upon standing overnight all of the solids had settled to yield a prefectly clear solution. Mg content was about 3.0%.

ILLUSTRATIVE EMBODIMENT XII

A solid crystalline material was first prepared according to the teachings of a previous patent (U.S. Pat. No. 4,855,371). Trimethylborate (147 g of a 90% solution, 1.27 mol) was dissolved in 1.5 liter of MeOH, under nitrogen, in a 3 liter, 3 neck flask. Magnesium turnings (30.9 g, 1.27 mol) were added to the rapidly stirring solution, in 7 portions, over about 2 hours (to moderate the rate of hydrogen evolution). After the sixth portion of Mg was added, precipitation began. The final slurry was refluxed for 3 hours then cooled to room temperature and filtered. After washing with isooctane and drying in a stream of nitrogen, 147 g of white, granular particles were obtained, in the 10-50 micron size range. Analysis: 11.3% Mg, 2.36% B. A second crop of granular particles of nearly uniform particle size was obtained by adding another 30.9 g of magnesium turnings to the filtrate from above. Yield 262 g. Analysis: 13.7% Mg, 2.6% B. (This crystalline material was insoluble in methanol.)

A portion of this crystalline material (10 g, 56.5 mmol Mg) was slurried in 25.3 g of methanol at room temperature then trimethylborate (92%, 13.3 g, 118 mmol) was added to produce a clear solution. Mg content was about 3.0%.

ILLUSTRATIVE EMBODIMENT XIII

A solid crystalline material was first prepared according to the teachings of a previous patent (U.S. Pat. No. 4,855,371). Magnesium methoxide (12% in methanol, stabilized with 0.125 equivalent of tetramethoxysilane) was added to 0.5 equivalent of 2-methylresorcinol (10% in methanol) to produce a crystalline precipitate (which was insoluble in methanol).

A portion of this crystalline material (8.5 g, 40 mmol Mg) was slurried in 28.5 g of methanol then trimethylborate (92%, 9.0 g, 80 mmol) was added to give a clear, orange solution. Mg content was about 2.1%.

ILLUSTRATIVE EMBODIMENT XIV

Borate catalyst production was done in three separate phases. A triethylborate/magnesium ethoxide complex solution was prepared, the solution was spray dried to yield the catalyst support, and the support was metathesized to finally produce the catalyst.

In this example, 181 g of Mg metal flakes were added to 5950 g of dry ethanol. The ethanol was dried to less than 50 ppmw moisture using Linde 4A molecular sieves. Ferric chloride dissolved in ethanol, equivalent to a Fe/Mg molar ratio of 0.005 was added to the vessel. Triethylborate (1101 g) was added to the reactor at room temperature. During this addition, the temperature of the vessel contents increased from 23.8° C. to 36.4° C. The reactor contents were heated to 80° C. and held at this temperature for four hours. The solution was cooled to 40° C. prior to discharging it through 10 micron filters. The analysis of the solution indicated a Mg content of 2.67 wt %. The above solution composition was adjusted to contain 2 wt % Mg and 3.5 wt % AEROSIL R-972 ® hydrophobic silica. This was done by adding a mixture of 6033 g of the above solution and 1736 g of dry ethanol to 283 g of AEROSIL R-972 ® hydrophobic silica. The mixture was stirred for 20 minutes at 40° C. to ensure a uniform slurry composition.

The resulting slurry was spray dried under inert conditions using a Buchi laboratory spray dryer which operates inside a specially designed drybox. The spray drying conditions for preparing the support are given below:

Drying Gas=Nitrogen
Inlet Drying Gas Temperature=120° C.
Atomizer Gas Feed Rate=800 cc/min
Aspirator Rate=Approx. 27 scfm
Slurry Feed Rate=20 cc/min
Atomizer Nozzle Size=0.5 mm The spray dried support contained 15.7 wt % Mg.

The support was converted to a polypropylene catalyst by a method similar to the methods described before. The procedure began by adding 563.5 g of the above spray dried support to 13.4 kg of a 50:50 volume mixture of $TiCl_4$ and dry monochlorobenzene (CB) which contained 131.8 g of dissobutyl phthalate (DIBP). The DIBP/Mg molar ratio was 0.13. The addition was done at 20° C. This reaction mixture was held at 20° C. for 15 minutes before the temperature was ramped to 50° C. for a 30-minute hold. Following this hold, the reaction mixture temperature was increased to 110° C. and held there for one hour. The solids were separated from the liquid by filtration and then mixed with fresh CB.

The concentrated slurry was added to 12.2 kg of a 50:50 volume mixture of $TiCl_4$ and CB which contained 31.8 g of phthaloyl dichloride. The mixture was heated to 110° C. and held there for one hour. Again, the solids were separated by filtration and mixed with fresh CB.

This slurry was added to 12.2 kg of a 50:50 volume mixture of TiCl₄ and CB and heated to 110° C. and held for 30 minutes. The solids were separated by filtration and then washed with hexane six times on a filter funnel with a coarse porosity frit. Each wash consisted of 1500 ml of dry hexane. The solids were dried on the frit and then mixed with twice their mass of Kaydol mineral oil. The yield of the dry solids was 697 g. The Mg and Ti content of the washed product was 13.26 wt % and 1.86 wt % respectively.

What is claimed is:

1. An alkanol solution of an adduct of magnesium alkoxide wherein each alkoxide has up to 4 carbon atoms and an acidic material selected from sulfur dioxide, formaldehyde, aluminum alkoxide wherein each alkoxide has up to 4 carbon atoms or trialkylborate wherein each alkyl has up to 4 carbon atoms, the alkanol being methanol or ethanol and the molar ratio of the acidic material: magnesium alkoxide being from about 0.6 to about 2 and the concentration of magnesium being from about 1% by weight to about 8% by weight based on total solution.

2. The solution of claim 1 wherein the magnesium alkoxide is magnesium methoxide or magnesium ethoxide.

3. The solution of claim 2 wherein the magnesium alkoxide is magnesium ethoxide and the alkanol is ethanol.

4. The solution of claim 3 wherein the acidic material is sulfur dioxide.

5. The solution of claim 3 wherein the acidic material is formaldehyde.

6. The solution of claim 3 wherein the acidic material is aluminum oxide of the formula Al(OR)₃ wherein R individually is alkyl of up to 4 carbon atoms inclusive.

7. The solution of claim 6 wherein R is ethyl.

8. The solution of claim 3 wherein the acidic material is trialkylborate of the formula

B(OR)₃ wherein R independently is alkyl of up to 4 carbon atoms inclusive.

9. The solution of claim 8 wherein the trialkylborate is trimethylborate.

10. The solution of claim 8 wherein the trialkylborate is triethylborate.

11. The solution of claim 10 wherein the concentration of magnesium is from about 2% by weight to about 5% by weight based on total solution.

12. The process for solubilizing magnesium alkoxide wherein each alkoxide is methoxide or ethoxide in alkanol wherein the alkanol is methanol or ethanol which consists essentially of contacting the magnesium alkoxide and alkanol in the presence of sufficient acidic material selected from sulfur dioxide, formaldehyde, aluminum alkoxide wherein each alkoxide is methoxide or ethoxide and trialkylborate wherein each alkyl is methyl or ethyl to give the resulting solution a molar acidic material: magnesium of from about 0.6 to about 2 and a magnesium concentration of from about 1% by weight to about 6% by weight magnesium, based on total solution.

13. The process of claim 12 wherein the magnesium alkoxide is magnesium ethoxide.

14. The process of claim 13 wherein the alkanol is ethanol.

15. The process of claim 14 wherein the acidic material is sulfur dioxide.

16. The process of claim 14 wherein the acidic material is formaldehyde.

17. The process of claim 14 wherein the acidic material is aluminum alkoxide.

18. The process of claim 17 wherein R is ethyl.

19. The process of claim 14 wherein the acidic material is trialkylborate.

20. The process of claim 19 wherein R is ethyl.

21. The process of claim 20 wherein sufficient magnesium ethoxide is provided to the resulting solution to give a magnesium concentration of from about 1% by weight to about 6% by weight based on total solution.

22. The process of claim 21 wherein the magnesium ethoxide results from reaction of provided elemental magnesium and a portion of the ethanol.

23. A process for the production of a mixture of solid, substantially uniform spheroidal particles substantially free from fines containing magnesium alkoxide wherein each alkoxide has up to 4 carbon atoms which process employs an alkanol solution, wherein the alkanol is ethanol or methanol, of an adduct of magnesium alkoxide wherein each alkoxide has up to 4 carbon atoms and an acidic material selected from sulfur dioxide, formaldehyde, aluminum alkoxide wherein each alkoxide has up to 4 carbon atoms, or trialkylborate wherein each alkyl has up to 4 carbon atoms wherein the molar ratio of the acidic material: magnesium is from about 0.6 to about 2 and wherein the concentration of magnesium is from about 1% by weight to about 6% by weight, based on total solution, the process comprising (1) spray drying the alkanol solution or (2) impregnating solid inorganic oxide spherical particles with the alkanol solution.

24. The process of claim 21 wherein the magnesium alkoxide is magnesium methoxide or magnesium ethoxide.

25. The process of claim 24 wherein the alkanol is ethanol and the magnesium alkoxide is magnesium ethoxide.

26. The process of claim 25 wherein the acidic material is a trialkylboron of the formula

B(OR)₃ wherein R independently is methyl or ethyl.

27. The process of claim 26 wherein R is ehtyl.

28. The process of claim 27 wherein the process comprises spray drying the ethanol solution.

29. As an article of manufacture, the mixture of substantially spheroidal particles produced by the process of claim 23.

30. As an article of manufacture, the mixture of substantially spheroidal particles produced by the process of claim 28.

31. The mixture of particles of claim 30 wherein no more than 1% of the particles is outside the range of from about 8 microns to about 100 microns in size.

* * * * *